(12) United States Patent
Sinyak et al.

(10) Patent No.: US 7,320,105 B1
(45) Date of Patent: Jan. 15, 2008

(54) DATA DISPLAY USING MULTICOLUMN SCROLLING

(75) Inventors: Igor Sinyak, Mountain View, CA (US); David L. Sprague, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 612 days.

(21) Appl. No.: 09/371,716

(22) Filed: Aug. 9, 1999

Related U.S. Application Data

(63) Continuation of application No. 09/204,006, filed on Dec. 1, 1998, now abandoned.

(51) Int. Cl.
*G06F 15/00* (2006.01)
*G06F 17/00* (2006.01)

(52) U.S. Cl. ............ 715/526; 715/502; 715/513; 715/784; 715/785; 715/786

(58) Field of Classification Search ......... 707/526, 707/523, 513, 517, 502; 345/788, 684; 434/179; 715/526, 513, 502, 784–786
See application file for complete search history.

(56) References Cited

U.S. PATENT DOCUMENTS

| | | | | |
|---|---|---|---|---|
| 4,506,343 A | * | 3/1985 | Shipp et al. | 715/509 |
| 5,214,755 A | * | 5/1993 | Mason | 707/513 |
| 5,623,679 A | * | 4/1997 | Rivette et al. | 715/526 |
| 5,634,064 A | * | 5/1997 | Warnock et al. | 707/513 |
| 5,737,558 A | * | 4/1998 | Knight, III et al. | 345/788 |
| 5,895,476 A | * | 4/1999 | Orr et al. | 707/517 |
| 6,094,529 A | * | 7/2000 | Jeffries et al. | 717/128 |
| 6,113,394 A | * | 9/2000 | Edgar | 434/179 |
| 6,125,375 A | * | 9/2000 | Atkins et al. | 715/502 |
| 6,144,974 A | * | 11/2000 | Gartland | 707/517 |
| 6,151,609 A | * | 11/2000 | Truong | 707/505 |
| 6,205,454 B1 | * | 3/2001 | Dauerer et al. | 715/513 |
| 6,331,863 B1 | * | 12/2001 | Meier et al. | 345/684 |
| 6,389,437 B2 | * | 5/2002 | Stoub | 707/523 |
| 2003/0014445 A1 | * | 1/2003 | Formanek et al. | 707/526 |

OTHER PUBLICATIONS

Work Spill in Data Processing Mode, IBM Technical Disclosure Bulletin, Jun. 1, 1991, vol. 34, Issue 1, pp. 93-96.*
WordPerfect 6.1 For Windows, released Apr. 15, 1996 by Corel Corporation, screenshots from application, pp. 1-14.*
Goodwin, M. et al., Painless Web Pages, PC World Online, San Francisco, Apr. 19, 1998, pp. 1-8.*
WordPerfect 6.1 For Windows, released Apr. 15, 1996 by Coral Corporation, additional screenshots from application, pp. 15-18.*

* cited by examiner

*Primary Examiner*—William Bashore
(74) *Attorney, Agent, or Firm*—Schwegman, Lundberg & Woessner, P.A.

(57) ABSTRACT

Apparatus, software and method for displaying line-formatted materials in multiple columns of a screen display and providing for scrolling through the materials such that lines spill from one column to another, are disclosed. The columns form a display area for display of contiguous lines of the line-formatted materials, wherein diagonally opposite ends of the rightmost and leftmost columns define the starting and ending lines of the display area, such that when scrolling through line-formatted materials the lines flow into and out of the display area at the starting and ending lines. In another embodiment, Scripting language encoded line-formatted materials are displayed under the control of a web browser using the scrollable columns. In another embodiment, line-formatted materials are encoded with one or more Scripting language codes that specify to a web browser that the line-formatted materials are to be displayed in scrollable columns.

31 Claims, 9 Drawing Sheets

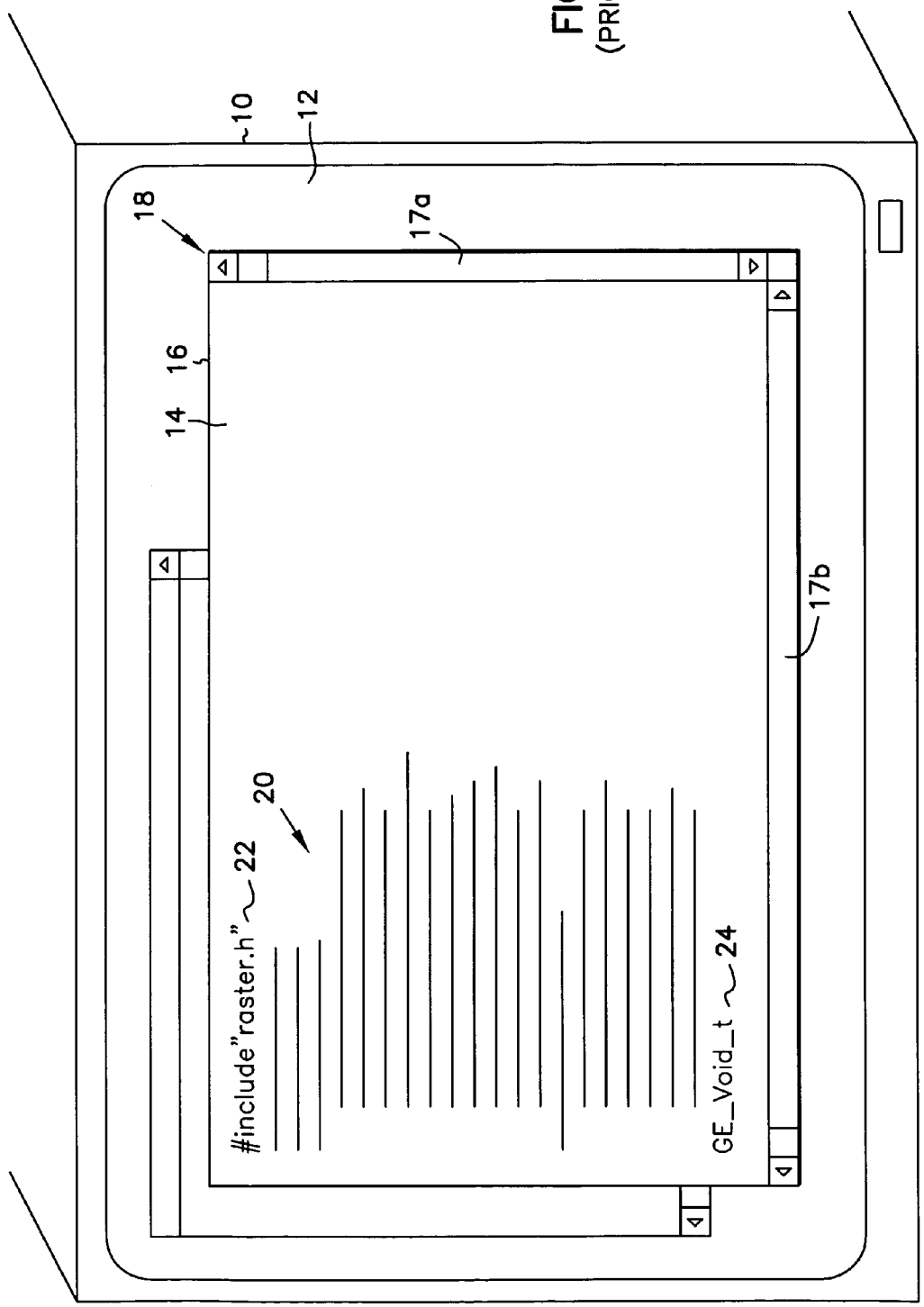

```
# include "raster.h"                   22
# include "clip.h"
# include "xform.h"
include <assert.h>
GE_Void_t
ge_ClipInit( GE_Context_t* GEContext )
{
    GE_ClipEquation_t default_equation = {0, 0, 0, 0};
    GE_Dword_t i;
    for (i = 0; i<GE_MAX_CLIP_PLANES; i++) {
        GEContext->Clip.EyeEq (i) = default_equation;
        GEContext->Clip.PlaneDefault (i) = 1;
        GEContext->Clip.PlaneOn (i) = -1;
    }
    GEContext->Clip.NPlanes = 0;
    GEContext->Clip.PlaneOnFlag = 0;
}  /* ge_ClipInit */
GE_Void_t
ge_ClipValidate (GE_Context_t* GEContext)
    GE_FuncTable_t*       table = GEContext->currentTable;
    if ( (GEContext->StateType & GE_CLIPPING) &&
            (GEContext->Clip.Nplanes l = 0 ) ) {
        GEContext->geClipCodeUser = table ->ClipFn [GE_FN_CLIP_USER];
        GEContext->ClipPlaneToObject = table->ClipFn [GE_FN_CLIP_EYE_TO_OBJ];
    } else {
        GEContext->geClipCodeUser = table->ClipFn [GE_FN_CLIP_DEFAULT];
        GEContext->ClipPlaneToObject = table->ClipFn [GE_FN_CLIP_DEFAULT];
    }
    if  (GEContext->StateType & GE_CLIP_VOLUME) {
        GEContext->geClipCodeView = table->ClipFn [GE_FN_CLIP_VIEW];
    } else {
        GEContext->geClipCodeView = table->ClipFn [GE_FN_CLIP_DEFAULT];
    }
}
GE_Void_t        24
```

FIG. 2 (PRIOR ART)

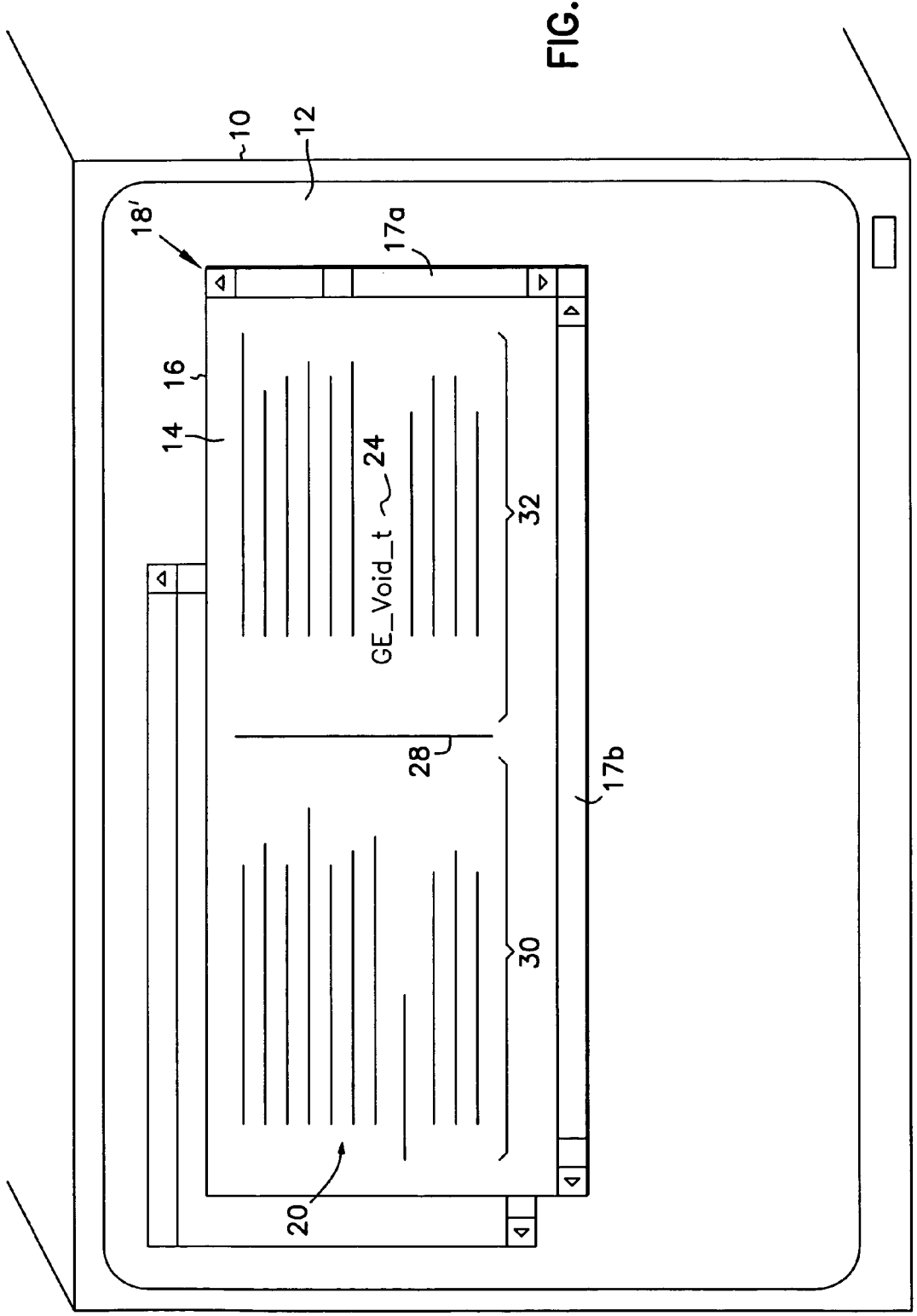

22

```
# include "raster.h"
# include "clip.h"
# include "xform.h"
include <assert.h>

GE_Void_t
ge_ClipInit ( GE_Context_t* GEContext )
{
    GE_ClipEquation_t default_equation = { 0, 0, 0, 0 };
    GE_Dword_t i;

for (i=0; i<GE_MAX_CLIP_PLANES; i++)  {
        GEContext->Clip.EyeEq[i] = default_equation;
        GEContext->Clip.PlaneDefault[i] = 1;
        GEContext->Clip.PlaneOn [i] = -1
    }

GEContext->Clip.NPlanes = 0;
    GEContext->Clip.PlaneOnFlag = 0;

} /* ge_ClipInit */
```

FIG 4L

```
GE_Void_t
ge_ClipValidate ( GE_Context_t* GEContext )
{
    GE_FuncTable_t*     table = GEContext->currentTable;
    if( ( ( GEContext->StateType & GE_CLIPPING ) &&
          (GEContext->Clip.NPlanes 1 = 0) ) ) {
        GEContext->geClipCodeUser = table->ClipFn[GE_FN_CLIP_USER];
        GEContext->geClipPlaneToObject = table->ClipFn[GE_FN_CLIP_EYE_TO_OBJ];
    } else {
        GEContext->geClipCodeUser = table->ClipFn[GE_FN_CLIP_DEFAULT];
        GEContext->geClipPlaneToObject = table->ClipFn[GE_FN_CLIP_DEFAULT];
    }
    if(GEContext->StateType & GE_CLIP_VOLUME) {
        GEContext->geClipCodeView = table->ClipFn[GE_FN_CLIP_VIEW];
    } else {
        GEContext->geClipCodeView = table->ClipFn[GE_FN_CLIP_DEFAULT];
    }
}
GE_Void_t  24
```

FIG. 4R

```
GE_Void_t
ge_ClipInit ( GE_Context_t* GEContext )
{
    GE_ClipEquation_t default_equation = {0, 0, 0, 0};
    GE_Dword_t i;

for (i = 0; i<GE_MAX_CLIP_PLANES; i++)  {
        GEContext->Clip.EyeEq[i] = default_equation;
        GEContext->Clip.PlaneDefault[i] = 1;
        GEContext->Clip.PlaneOn[i] = -1;
    }

GEContext->Clip.NPlanes = 0;
    GEContext->Clip.PlaneOnFlag = 0;

} /* ge_ClipInit */

GE_Void_t
ge_ClipValidate ( GE_Context_t* GEContext )
{
    GE_FuncTable_t*   table = GEContext->currentTable;
```

FIG. 5L

```
if ( ( GEContext->StateType & GE_CLIPPING ) &&
     (GEContext->Clip.NPlanes 1 = 0 ) ) {
    GEContext->geClipCodeUser = table->ClipFn [GE_FN_CLIP_USER];
    GEContext->geClipPlaneToObject = table->ClipFn{GE_FN_CLIP_EYE_TO_OBJ];

} else {
    GEContext->geClipCodeUser = table ->ClipFn[GE_FN_CLIP_DEFAULT];
    GEContext->geClipPlaneToObject = table ->ClipFn [GE_FN_CLIP_DEFAULT];
}
if (GEContext->StateType & GE_CLIP_VOLUME) {
    GEContext->geClipCodeView = table ->ClipFn[GE_FN_CLIP_VIEW];
} else {
    GEContext->geClipCodeView = table ->ClipFn [GE_FN_CLIP_DEFAULT];
}
    ⤸ 24
GE_Void_t
ge_ClipEnable ( GE_Context_t* GEContext, GE_Dword_t plane )
{
    if ( GEContext->Clip.PlaneOnflag & (1 << plane) ) {
        /* Plane allredy on */
```

FIG. 5R

DATA DISPLAY USING MULTICOLUMN SCROLLING

This application is a Continuation of application Ser. No. 09/204,006, filed Dec. 1, 1998 now abandoned.

FIELD OF THE INVENTION

The present invention relates generally to display of data, and more particularly to displaying scrollable text or data on a computer display.

BACKGROUND OF THE INVENTION

The large computer screen displays and high resolution pixel densities that are now in widespread use make it possible to display many more characters per line than was previously possible. For example, a 21" monitor with 1280×1024 resolution can display upwards to 200 or more alphanumeric characters or other discrete language symbols per line using a visually acceptable size font, such as a 10 point font.

While such large screen displays have the capability to display a large number of alphanumeric characters per line, commonly used text-based documents have a form that is incompatible to a greater or lesser extent with displaying such a large number of characters on a single line. For example, source code rarely goes over 80 characters per line, so it inherently is unable to take advantage of such capacity. Also, the lines of text in printed media, such as newspapers or books, become more difficult or unwieldy to read if too long, such that the reader may be required to turn his or her head to read a line, and potentially lose track of what line of text they are on when traversing from the end of one line to the beginning of the next. As a result, most documents do not exceed approximately 100 characters per line. Thus, while a single line of text could extend from one side of a 200 character per line display to the other, such a display would not likely be preferred by most individuals.

SUMMARY OF THE INVENTION

In one embodiment, the present invention provides a method for displaying line-formatted materials on a screen display in two or more adjacent columns, wherein lines spill from the bottom of one column to the top of an adjacent column when scrolling therethrough.

BRIEF DESCRIPTION OF THE DRAWINGS

FIGS. 1 and 2 illustrates the display of source code on a screen display using a prior art technique;

FIGS. 3A, 3B, 4L, 4R, 5L and 5R illustrate the display of source code on a screen display according to one embodiment of the invention, wherein "L" denotes the left column and "R" denotes the right column.

DETAILED DESCRIPTION OF THE INVENTION

Figure 3A:
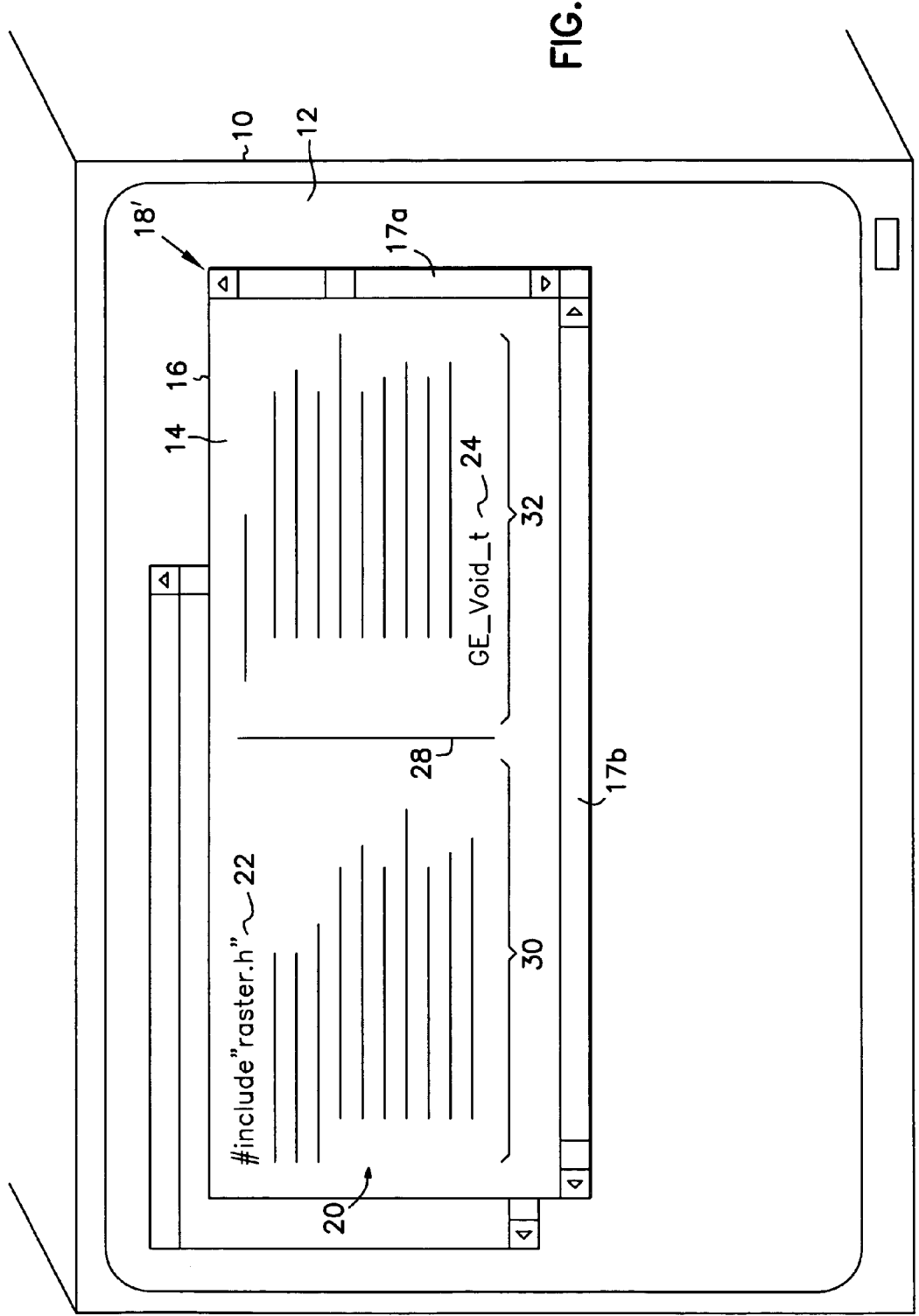

In the following detailed description of the invention, reference is made to the accompanying drawings which form a part thereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims, along with the full scope of equivalents to which such claims are entitled.

Referring now to FIG. 1, there is illustrated a prior art technique for displaying source code on a computer display device 10. Display device 10 includes a screen display 12, which may be, for example and without limitation, the display surface of a cathode ray tube, a liquid crystal display or a plasma display device. A display area 14 having border 16 defines a window 18 that is actively controlled by the display driver of a computing device (described below) for the purpose of displaying alphanumeric characters or other symbols in a sequence of descending lines (or, alternatively, ascending if desired). Window 18 may, for example, be presented on a 21" (or equivalent metric size) size display with 1280×1024 resolution that can display upwards to 200 or more alphanumeric characters or other discrete language symbols per line using a visually acceptable size font, such as a 10 point font. While window 18 is shown with a visible border 16 for the sake of clarity, it is not necessary that the border 16 be visible. Such a visible border may be present, for example, where the window 18 is created and controlled by a windowing-type based display system, with scroll bar 17a and 17b, such as that used by the Windows 95® operating system available from Microsoft Corporation. Other window may be displayed above, below or on top of window 18, as is conventional.

In FIG. 1, a sequence of source code lines 20 is displayed, beginning with the line "#include "raster.h", identified with the reference number 22, and concluding with the line "GE_Void_t", identified with the reference number 24. In this example herein presented Source code 20 generically represents line formatted materials; thus, the invention is in no way limited to use in displaying source code. Source code 20 is shown in greater detail in FIG. 2. It is noted that less than approximately one-half (½) the width of window 18 is filled with source code 20. In this mode of display, in order to read the line above line 22, the source code needs to be scrolled down, such that line 22 moves to a line below its position in FIG. 1, and line 24 is pushed off of the display altogether. This is conventional scrolling operation. Scrolling may be accomplished by moving a cursor in the direction of the next line "above" or "below" the display area 14, by use of the scroll bar 17a on the side of the window 18, or by any other means.

Referring now to FIGS. 3A and 3B, there is illustrated a system for displaying and scrolling line-formatted materials according to one embodiment of the invention. As used herein, the term "line-formatted materials" means any information which is organized as a sequence of lines to be displayed in a descending (or ascending) sequence on a screen display, wherein at least some of the lines are made up at least in part by discrete symbols, such as, but not limited to, alphanumeric characters or graphic icons or pictures. Furthermore, line-formatted materials may be displayed in conjunction with graphic elements that precede or follow the materials, or are displayed side by side therewith. For example, displayed text may wrap around a graphic element.

As illustrated in FIG. 3A, the sequence of source code 20 is displayed in two columns 30 and 32 within window 18' in the same display 12, which is the same size as it was shown in FIG. 1. Window 18' is approximately ½ the height of window 18, and includes a visible center dividing line 28 that visually separates each column 30 and 32. However, line 28 may be omitted if desired. Line 22 of the source code is displayed at the top of column 30, in the first or "starting" line of the display area 14. Line 26, now at the bottom of column 32, is the last or "ending" line of the display area 14. As illustrated, only about one-half (½) as many lines of the display 12 are needed to display the same number of lines of code as were required in the prior art display technique of FIG. 1. The source code shown in columns 30 and 32 in FIG. 3A is shown in greater detail in FIGS. 4L and 4R, respectively, wherein "L" denotes the left column and "R" denotes the right column.

FIG. 3B illustrates the effect of scrolling the source code illustrated in FIG. 3A. By scrolling the source code 20 "down," line 22 and the four lines below it are moved off the top of the display area of column 30, five lines from the top of column 32 are moved to the bottom of column 30, and five new lines are added to the display area 14 at the bottom of column 32. Scrolling the source code 20 "up" produces the opposite effect. Thus, the line 36 at the top of column 32 is always the next sequential line following line 34 at the bottom of column 30. This operation can be defined as spilling lines from the bottom of column 30 to the top of column 32. The source code shown in columns 30 and 32 in FIG. 3B is shown in greater detail in FIGS. 5L and 5R, respectively.

Although the embodiment of FIGS. 3A and 3B is illustrated with two columns, the invention is no way limited in this respect. Three or more columns may be provided, side by side, with lines spilling from the bottom of the left-most column spilling to the top of the next column over, and so on from the bottom of this column to the top of the next, as the line-formatted material is scrolled. Line-formatted material is thus scrolled through the display area that begins with the starting line at the top end of the left-most column, and ends with the ending line at the bottom end of the right-most column. Of course, the starting and ending lines of the display can be defined differently, provided that these lines start and end at diagonally opposite ends of the display area 14.

Moreover, although the embodiment of FIGS. 3A and 3B illustrates the display of source code, the invention is equally applicable to the display of any line-formatted materials, as defined above. To reiterate, such line-base materials include, for example, printed materials as may be found in books, magazines or web sites.

Figure 6:
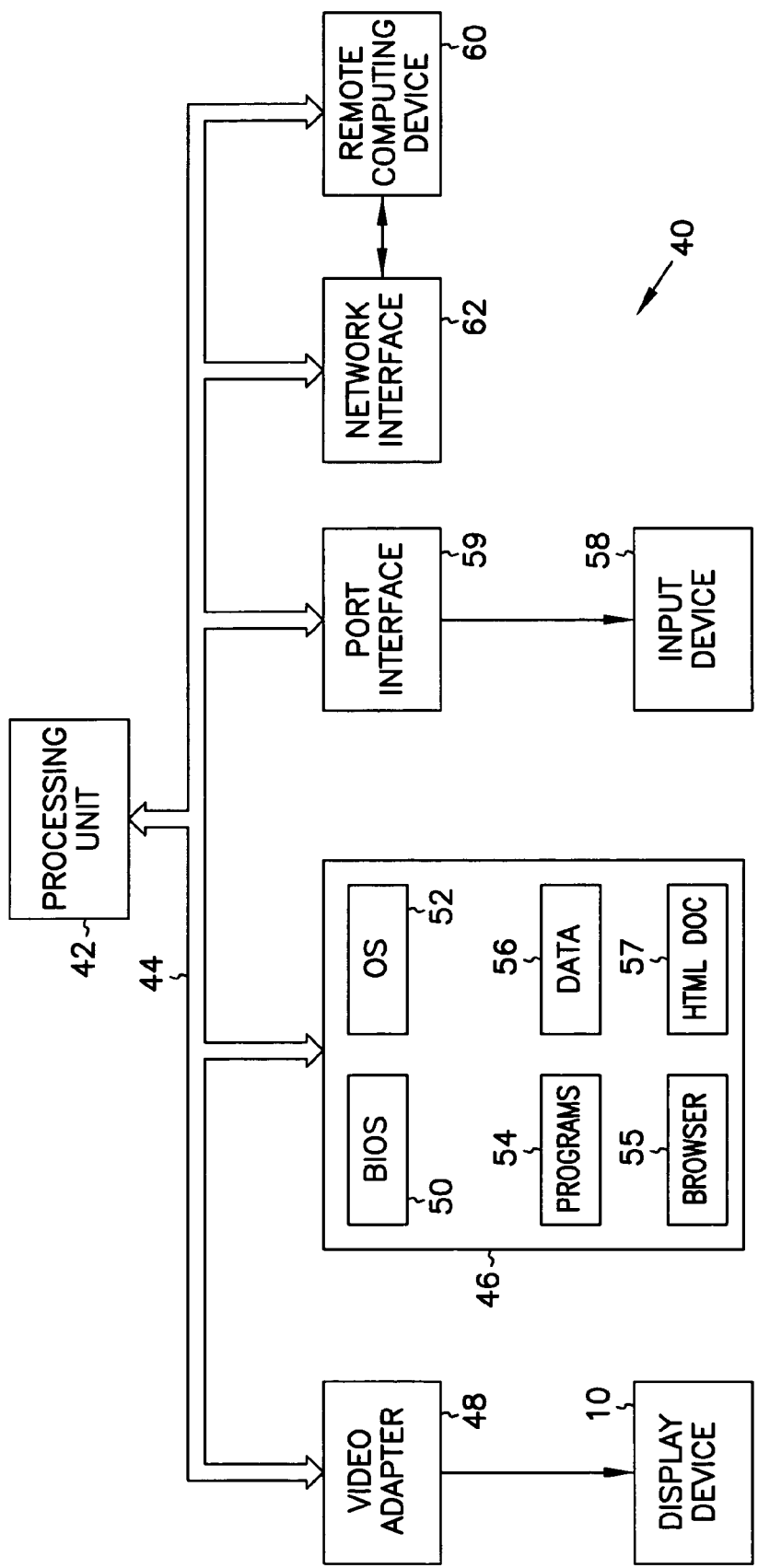
FIG. 6 illustrates a computer system including the display capabilities illustrated in FIGS. 3A, 3B, 4L, 4R, 5L and 5R according to one embodiment of the invention.

In respect of line-formatted materials found on the web, one example embodiment of the invention includes the provision of an internet scripting language, such as hypertext mark-up language (HTML) or XML, formatting that is interpreted by a web browser (such as Netscape's Navigator® browser) to display line-formatted web content in the manner illustrated with respect to FIGS. 3A and 3B. Thus, line-formatted web content is encoded with Scripting language codes that cause the browser to display content in scrollable multiple columns with line spill from one column to the next. Such a Scripting language encoded document 57 is illustrated in FIG. 6. Alternatively, in another embodiment a web browser 55 includes the capability to display line-formatted web content in line spilling, scrollable columns without any special Scripting language encoding in the content.

Referring now to FIG. 6, there is illustrated a simplified block diagram of a computer system 40. Computer system 40 includes a processing unit 42, and a system bus 44 connecting the processing unit 42 to system memory or disk drive storage 46 and a video adapter 48 that in turn is connected to display device 10. Storage 46 includes, for example, a ROM BIOS 50, operating system 52, application and other programs 54, data 56, a web browser 55, and an HTLM document 57. A user input device 58, such as a mouse, keyboard or microphone for voice activation, provides a scrolling control signal to the system through port interface 59. A remote computing device 60 is also connected to bus 44 through a network interface 62. In one embodiment, the display methodology illustrated with respect to FIGS. 3A and 3B is implemented under software control, with the necessary software being either included in the ROM BIOS 50, operating system 52, application and other programs 54, such as a line editor or web browser, or in any combination thereof.

Where the control is provided in software, the software may be encoded in any storage medium such as but not limited to RAM, magnetic or optical storage media, or in, for example, a computer system or network. Alternatively, such control may be provided in under hardware control, or a combination of hardware and software control. In either case, line-formatted materials obtained from the storage 46 (which may be, for example and without limitation, RAM, hard disk, flexible or floppy disk, optical disk) or the remote computing device 60, or another source, are displayed in a scrollable, multicolumn, line-spilling mode under the control of a scrolling control signal received from a user.

Thus, the above-described embodiments of the invention provide for a more efficient and user-friendly manner of displaying line-formatted materials on large capacity displays. Embodiments of the invention take the form, for example, of a software product, such as an operating system, video display drive, or web browser, or the form of a computer system including a computer and display device programmed or configured with hardware to provide the scrolling mode of display of line-formatted materials as described above. An embodiment of the invention also takes the form of Scripting language codes that can be encoded into Scripting language encoded materials to direct a suitably programmed web browser to display the encoded materials as describe with respect to FIGS. 3A and 3B.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method comprising displaying line-formatted materials on a screen display in two or more adjacent columns, wherein the columns are arranged on a single page displayed to a user, wherein the columns remain fixed to the single page while scrolling through the line-formatted materials, wherein lines of each column are adjusted while scrolling by spilling from the bottom of one column to the top of an adjacent column, or from the top of one column to the bottom of an adjacent column.

2. A method according to claim 1 wherein the screen display is at least in part under the control of a computing device with one or more keyboard keys, and at least one mode of scrolling through the line-formatted materials is accomplished under control of a single key.

3. A method according to claim 1 wherein the screen display is at least in part under the control of a computing device with a mouse input device, and at least one mode of scrolling through the line-formatted materials is accomplished under control of the mouse input device.

4. A method according to claim 1 wherein the screen display is at least in part under the control of a computing device with a microphone, and at least one mode of scrolling through the line-formatted materials is accomplished under control of a single voice command spoken to the microphone.

5. A method according to claim 1 wherein the columns form a display area for display of contiguous lines of the line-formatted materials, and wherein diagonally opposite ends of the rightmost and leftmost columns define the starting and ending lines of the display area, such that when scrolling through line-formatted materials the lines flow into and out of the display area at the starting and ending lines.

6. A method according to claim 1 wherein the line-formatted materials are source code.

7. A method according to claim 1 further wherein the line-formatted materials are displayed in conjunction with graphical elements.

8. A method comprising displaying Scripting language encoded line-formatted materials under the control of a web browser such that the line-formatted materials are displayed under control of the web browser in two or more adjacent columns of a screen display, wherein the columns are arranged on a single page displayed to a user, wherein the columns remain fixed to the single page while scrolling through the line-formatted materials, wherein lines of each column are adjusted while scrolling by spilling from the bottom of one column to the top of an adjacent column, or from the top of one column to the bottom of an adjacent column.

9. A method according to claim 8 wherein the Scripting language encoded line-formatted materials include Scripting language codes that instruct the browser to adjust the columns by spilling lines when scrolling.

10. A method according to claim 8 wherein the browser accomplishes column adjustment through spilling of lines from one column to the other without instruction from Scripting language codes specifying such operation.

11. A method according to claim 8 wherein the line-formatted materials are human readable text.

12. A method comprising encoding line-formatted materials to be displayed using a web browser with one or more Scripting language codes that specify to the web browser that the line-formatted materials are to be displayed in two or more adjacent columns that remain fixed to a single page while scrolling through the line-formatted material, wherein lines of each column are adjusted while scrolling by spilling from the bottom of one column to the top of an adjacent column, or from the top of one column to the bottom of an adjacent column.

13. A method according to claim 12 further wherein the line-formatted materials are displayed in conjunction with graphical elements.

14. A machine readable document encoded in a tangible medium, wherein the document includes line-formatted materials and the materials are encoded with one or more Scripting language codes that specify to a web browser that the line-formatted materials are to be displayed in two or more adjacent columns that remain fixed within a display while scrolling, wherein lines within the columns are adjusted while scrolling by spilling from the bottom of one column to the top of an adjacent column, or from the top of one column to the bottom of an adjacent column.

15. The machine readable document according to claim 14 further wherein the line-formatted materials are displayed in conjunction with graphical elements.

16. A program product comprising a computer program encoded in a tangible medium, the program code operative on a suitably configured computer to display line-formatted materials on a screen display in two or more adjacent columns that remain fixed within a display while scrolling, wherein lines within the columns are adjusted while scrolling by spilling from the bottom of one column to the top of an adjacent column, or from the top of one column to the bottom of an adjacent column, when scrolling through the line-formatted materials.

17. A product according to claim 16 wherein the program code is operative on the computer to scroll through the line-formatted materials under control of a single key providing input to the computer.

18. A product according to claim 16 wherein the program code is operative on the computer to scroll through the line-formatted materials under control of a mouse device providing input to the computer.

19. A product according to claim 16 wherein the program code is operative on the computer to scroll through the line-formatted materials under control of a voice command input to the computer.

20. A product according to claim 16 wherein the columns form a display area for display of contiguous lines of the line-formatted materials, and wherein diagonally opposite ends of the rightmost and leftmost columns define the starting and ending lines of the display area, such that when scrolling through line-formatted materials the lines flow into and out of the display area at the starting and ending lines.

21. The program product according to claim 16 further wherein the line-formatted materials are displayed in conjunction with graphical elements.

22. A program product comprising a computer program encoded in a tangible medium, the program code operative on a suitably configured computer to display Scripting language encoded line-formatted materials such that the line-formatted materials are displayed in two or more adjacent columns of a screen display, wherein the columns remain fixed while scrolling, wherein lines within the columns are adjusted while scrolling by spilling from the bottom of one column to the top of an adjacent column, or from the top of one column to the bottom of an adjacent column.

23. A product according to claim 22 wherein the Scripting language encoded line-formatted materials include Scripting language codes that instruct the computer program to adjust the columns by spilling lines from column to column when scrolling.

24. A product according to claim 23 wherein the program accomplishes the column adjustment by spilling of lines from one column to the other without instruction from Scripting language codes specifying such operation.

25. A product according to claim 24 wherein the line-formatted materials are source code.

26. A product according to claim 24 wherein the line-formatted materials are human readable text.

27. The program product according to claim 22 further wherein the line-formatted materials are displayed in conjunction with graphical elements.

28. A program product comprising line-based materials encoded in a tangible medium, line-formatted materials to be displayed using a web browser and encoded with one or more Scripting language codes that specify to a web browser that the line-formatted materials are to be displayed in two or more adjacent columns that remain fixed while scrolling through the line-formatted materials, wherein lines are adjusted within the columns while scrolling by spilling from the bottom of one column to the top of an adjacent column, or from the top of one column to the bottom of an adjacent column.

29. A machine readable document encoded in a tangible medium, wherein the document includes line-formatted materials and the materials are encoded with one or more Scripting language codes that specify to a web browser that the line-formatted materials are to be displayed in two or more adjacent columns that remain fixed during scrolling, wherein lines within the columns are adjusted while scrolling by spilling from the bottom of one column to the top of an adjacent column, or from the top of one column to the bottom of an adjacent column.

30. A system comprising a computer programmed to display line-formatted materials on a computer screen display in two or more adjacent columns, wherein the columns remain fixed when the line-formatted materials are scrolled, wherein lines when scrolled spill from the bottom of one column to the top of an adjacent column, or from the top of one column to the bottom of an adjacent column.

31. A system according to claim 30 further wherein the line-formatted materials are displayed in conjunction with graphical elements.

* * * * *